US012660894B2

(12) United States Patent
Broadbent

(10) Patent No.: US 12,660,894 B2
(45) Date of Patent: Jun. 23, 2026

(54) ZIP FASTENER

(71) Applicant: Tailfin Limited, Bristol (GB)

(72) Inventor: Nicholas Broadbent, Long Ashton (GB)

(73) Assignee: TAILFIN LIMITED, Bristol (GB)

( * ) Notice: Subject to any disclaimer, the term of this patent is extended or adjusted under 35 U.S.C. 154(b) by 0 days.

(21) Appl. No.: 18/673,695

(22) Filed: May 24, 2024

(65) Prior Publication Data

US 2024/0389719 A1 Nov. 28, 2024

(30) Foreign Application Priority Data

May 25, 2023 (GB) ...................................... 2307885

(51) Int. Cl.
*A44B 19/24* (2006.01)
*B62J 9/20* (2020.01)

(52) U.S. Cl.
CPC ................. *A44B 19/24* (2013.01); *B62J 9/20* (2020.02)

(58) Field of Classification Search
CPC . A44B 19/24; A44B 19/32; B62J 9/20; A45C 13/10
See application file for complete search history.

(56) References Cited

U.S. PATENT DOCUMENTS

| | | | |
|---|---|---|---|
| 6,519,826 B1 | 2/2003 | Ortlieb | |
| 2004/0139528 A1* | 7/2004 | Hord | A44B 19/32 |
| | | | 2/96 |
| 2007/0261977 A1 | 11/2007 | Sakai | |
| 2008/0040837 A1* | 2/2008 | King | A41D 27/00 |
| | | | 112/475.16 |
| 2012/0017346 A1* | 1/2012 | Reimer | A41D 27/28 |
| | | | 2/243.1 |
| 2021/0307459 A1* | 10/2021 | Turner | A44B 19/262 |

FOREIGN PATENT DOCUMENTS

| | | |
|---|---|---|
| GB | 2366512 A | 3/2002 |
| JP | 49002657 | 1/1974 |
| JP | 2005211151 | 8/2005 |
| WO | 2003037132 A2 | 5/2003 |
| WO | 2004068992 A2 | 8/2004 |
| WO | 2008006358 A2 | 1/2008 |

OTHER PUBLICATIONS

UK Search Report dated Nov. 14, 2024 in co-pending UK Patent Application No. GB2407442.9.
UK IPO Combined Search and Examination Report dated Nov. 28, 2023 in co-pending GB Application No. 2307885.0.

* cited by examiner

*Primary Examiner* — David M Upchurch
(74) *Attorney, Agent, or Firm* — Perilla Knox & Hildebrandt LLP

(57) ABSTRACT

A zip fastener is provided for opening and closing and opening in an article such as a cargo pack for mounting on a bicycle. The zip fastener comprises zip tracks and a slider which is movable between opened and closed positions. In the closed position, the slider is accommodated within a hood. A gutter component is secured to the inside face of the pack and defines a gutter which can receive water, such as rainwater, leaking past the zip tracks in the region of the closed position of the slider. A drain hole is provided which allows liquid accumulating in the gutter to pass to the exterior of the pack. This measure prevents rainwater and the like from reaching the contents of the pack.

10 Claims, 2 Drawing Sheets

ZIP FASTENER

FIELD OF THE INVENTION

This invention relates to a zip fastener, and is particularly although not exclusively concerned with a zip fastener for opening and closing an opening in a receptacle such as a cargo pack for use on a bicycle.

BACKGROUND

Bikepacking is a popular leisure pursuit which often involves multi-day touring on a bicycle, often an off-road bicycle such as a mountain bike. Everything needed for touring is carried on the bicycle or by the rider. Cargo packs attached to bicycle frames are used to carry clothing and other items, and such packs commonly have openings which can be closed by zip fasteners. Zip fasteners are known which have specially designed zip tracks which can be engaged with each other by means of a slider in a water-resistant manner so that water, such as rainwater, cannot penetrate past the closed zip fastener to the interior of the pack. A problem with such zip fasteners is that, when closed, there is a small region at the end of the zip fastener beyond the slider where the zip tracks do not come completely together and so provide a leakage path enabling rainwater to pass into the pack.

SUMMARY

According to the present invention there is provided a zip fastener on an article for closing an opening in the article, the zip fastener comprising a pair of zip tracks and a slider which is displaceable along the zip tracks between an open position at which the zip tracks are released from each other and a closed position in which the tracks are engaged with each other to close the opening, a gutter being provided on an inside surface of the article adjacent the closed position of the slider, the gutter comprising a gutter component which is formed from a water-impermeable material and which extends across the zip tracks, the gutter component having side edges which are secured in a watertight manner to the material of the article on each side of the zip tracks and an end edge which is secured in a watertight manner to the material of the article at a position beyond the closed position of the slider in a direction away from the open position, a drain hole in the material of the article providing a flow path from the gutter to the exterior of the article.

The gutter component may be secured to the material of the article by welding. The gutter may extend at least beneath a region between the slider in its closed position and the end of zip tracks. The gutter may extend to a position beyond the closed position of the slider in the direction towards the open position. The gutter may extend towards the open position of the slider for a distance less than 10% of the length of the zip tracks The gutter may be open to the interior of the article at the end of the gutter directed towards the open position of the slider.

A hood may be provided on the exterior of the article at the closed position of the slider for accommodating the slider when in the closed position.

The zip fastener may extend downwardly from the open position to the closed position of the slider in the intended use position of the article.

The article may be a cargo pack. The cargo pack may be provided with attachments for securing the cargo pack to a frame member of a bicycle.

The article may be made from a flexible material to which the zip tracks are secured.

BRIEF DESCRIPTION OF THE DRAWING FIGURES

For a better understanding of the present invention, and to show more clearly how it may be carried into effect, reference will now be made, by way of example, to the accompanying drawings, in which.

DETAILED DESCRIPTION

The pack shown in the Figures comprises a body 2 which is collapsible, in the sense that it is not so rigid that it can withstand moderate compressive forces applied to it. For example, the pack may be made from a waterproof textile or sheet material, such as a 420D nylon or other plastics material, which is sufficiently stiff to maintain its shape when unstressed, but which will flex if, for example, baggage items are pressed forcefully into the pack, or if straps or the like are tensioned around the periphery of the pack. As can be appreciated from the Figures, the pack has an elongate form, with a generally rectangular or trapezium-shaped cross-section.

Figures 1, 2, 3:
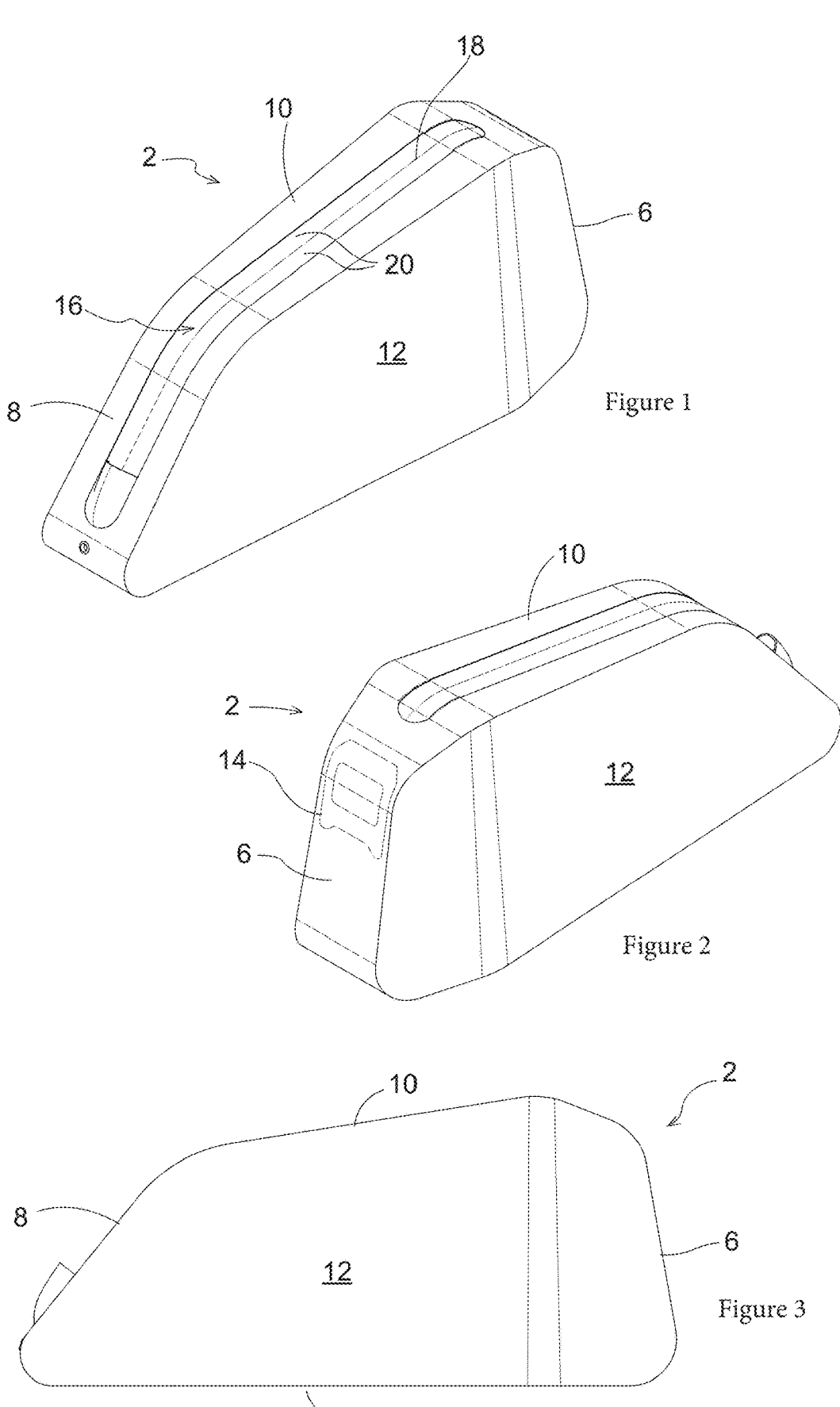
FIG. 1 is a view of a cargo pack for mounting on a bicycle, viewed from one side and from the rear of the pack, with respect to the travel direction of the bicycle.
FIG. 2 is a view of the cargo pack taken from the opposite side and the front.
FIG. 3 is a side view of the cargo pack.

The pack has a lower wall 4 which, in use, is laid over a frame member, such as a top tube, of a bicycle to which the pack is fitted, so that the pack extends generally horizontally, as shown in FIG. 3. The pack has a front wall 6 and an oblique rear wall 8, and, in normal use, the front wall 6 will face forwards in the direction of travel of the bicycle. The pack also has a top wall 10 and opposite sidewalls 12. It will be appreciated that, in the orientation shown in FIG. 3, the top wall 10 and the rear wall 8 slope downwardly in the direction from the front wall 6.

The front wall 6 has a flap 14 which covers an opening to enable supply lines such as electrical charging cables and drinking tubes to pass from batteries or drink bottles within the pack to electrical devices and mouthpieces situated outside the pack.

Access to the interior of the pack 2 is provided through an opening 16 in the top wall 10 and the rear wall 8. The opening 16 can be closed by means of a zip fastener 18 which comprises a pair of zip tracks 20 and a slider 22 (see FIGS. 5, 6 and 7). As is conventional, the slider 22 is slidable along the zip tracks 22 to open the opening 16 when the slider 22 is at the end of the opening 18 nearer the front wall 6, and to close the opening 16 when the slider 22 is at the end of the opening 18 in the rear wall 8. For this purpose, the zip tracks 20 are engageable with each other to close the opening 16, for example by way of inter-engaging teeth or ribs. In this specification, the expression "zip fastener" is used to indicate any form of fastener which utilises tracks which can be engaged with, or disengaged from, one another by means of a slider travelling along the tracks.

The zip fastener 18 may be of known form in which the zip tracks 20 provide a water resistant seal between themselves when the zip fastener 18 is closed.

Figures 4, 5, 6, 7:
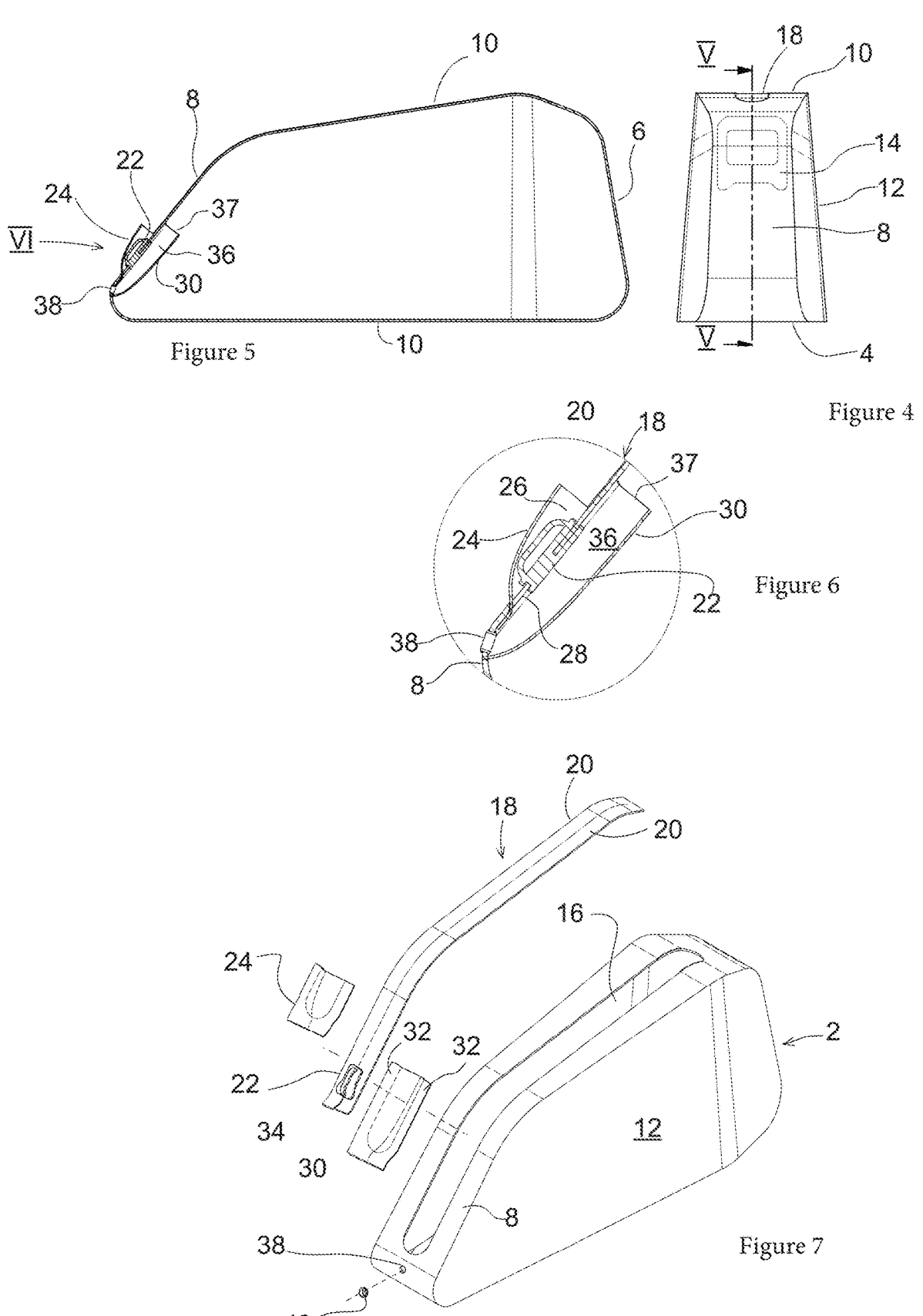
FIG. 4 is a front end view of the cargo pack.
FIG. 5 is a sectional view taken on the line V-V in FIG. 4.
FIG. 6 is an enlarged view of the region VI in FIG. 5.
FIG. 7 is an exploded view of the components of the cargo pack.

As shown in FIGS. 5 and 6, the rear wall 8 is provided at the end of the zip tracks 20 with a hood 24 which extends from a position at or beyond the rearmost end of the zip tracks 20 (with respect to the travel direction of the bicycle) in a forwards direction for a distance somewhat greater than the length of the slider 22 measured in the lengthwise direction of the zip fastener 18. The hood 24 defines a cavity 26 which, as can be appreciated from FIG. 6, is of a sufficient size to accommodate the slider 22, and consequently serves as a "garage" for the slider 22 when at the end of the zip fastener 18 corresponding to closure of the opening 16.

As is usual with zip fasteners, even those which are water resistant when closed, there is a small region 28 where the zip tracks 20 do not come completely together, or where the ends of the zip tracks 20 are not fully sealed to the fabric of the pack 2. Consequently a gap may be left at the ends of, or between, the tracks 20 which can allow rainwater falling on the pack 2 to leak into the interior of the pack.

In order to avoid this possibility, the rear wall 8 is provided, on its interior surface, with a gutter component 30 formed from a water-impermeable material which is sealed in a watertight manner to the material of the pack 2 along its side edges 32 and at its end edge 34 situated near the lower end of the rear wall 8. The component 30 may be secured to the material of the pack 2 by welding if the material of the pack 2 and the component 30 are made from compatible materials. The side and end edges 32 and 34 are secured to the material of the pack 2 on each side of the zip fastener 18 and at a position beyond the end of the zip fastener 18. The component 30 thus forms a gutter 36 into which any water penetrating through the gap at the region 28 can flow. It will be appreciated that the gutter 36 is open at its end 37 directed towards the open position of the slider 22 but is otherwise sealed to the material of the pack 2.

It will be appreciated that, with this construction, the gutter component 30 extends as an uninterrupted continuous layer of material across the zip fastener 18 along the partial length of the zip fastener extending over the region 28.

A drain hole 38 is situated in the rear wall 8 at a position close to the lower wall 4, and provides communication between the interior of the gutter 36 and the exterior of the pack 2. A grommet 40 is fitted within the drain hole 38. The drain hole is formed in the textile or sheet material of the pack and is thus in addition to any leak path that may be present between or at the ends of the tracks 20.

For use, the pack 2 is provided on its lower wall 4 with attachments (not shown) for securing the pack 2 to the top tube, or another frame member, of a bicycle. For example, the lower wall 4 may be provided with one or more mounts for receiving an elastomeric strap which can be secured around the top tube. In many instances, the pack will be mounted on the bicycle in the orientation shown in FIG. 3, i.e. with the lower wall 4 generally horizontal and the front wall 6 facing in the travel direction of the bicycle. The front wall 6 will be positioned close to the bicycle headset, while the rear wall 8 will face towards the rider.

In this orientation, and with the zip fastener 18 closed, any rainwater or splashed water falling on the top wall 10 or the rear wall 8 will tend to flow downwardly, possibly along the zip fastener 18. Any such water reaching the slider 22 housed in the cavity 26 may be able to leak through any gap 28 at the extreme end of the zip fastener 18. Any such leakage is retained within the gutter 36, which, as can be appreciated from FIG. 6, slopes downwardly from the open end 37 towards the drain hole 38. Water accumulating in the gutter 36 can thus readily flow through the drain hole 38, without entering the interior of the pack 2.

It will be appreciated that the component 30, and consequently the gutter 36, extend over a region of the inside surface of the rear wall 8 which runs from a position to the rear of and below the drain hole 38 to the open end 37, situated above and forwardly of the forward end of the hood 24. Consequently, even if the slider 22 is not moved completely into its extreme closed position within the hood 24, any unengaged regions of the tracks 20 will not allow penetration of water into the interior of the pack 2 to reach the contents of the pack 2. In one embodiment the gutter 36 extends from its lower end over a distance which is less than 10% of the overall length of the zip tracks 20. As a consequence, the greater part of the zip fastener 18 is not obstructed by the gutter 36, so that the gutter 36 does not significantly affect access to the interior of the pack when the zip fastener is open.

The hood 24 is of a sufficient size to accommodate the whole of the slider 22, although any tab or lanyard (not shown) attached to it may extend out of the cavity 26 to enable it to be grasped easily by the rider.

The component 30, forming the gutter 36, thus combines with the zip fastener 18 to resist penetration of rainwater into the pack 2. If the zip fastener 18 is constructed so as to be water-resistant, the structure described above can make the pack substantially watertight when closed.

Although the invention has been described with reference to a cargo pack for use on a bicycle, it will be appreciated that the structure of the gutter 36 can be employed with zip fasteners used on other receptacles, or indeed on different articles such as clothing.

For the avoidance of doubt, the present application extends to the subject-matter described in the following numbered Statements:

Statement 1. A zip fastener on an article for closing an opening in the article, the zip fastener comprising a pair of zip tracks and a slider which is displaceable along the zip tracks between an open position at which the zip tracks are released from each other and a closed position in which the tracks are engaged with each other to close the opening, a gutter being provided on an inside surface of the article adjacent the closed position of the slider, a drain hole providing a flow path from the gutter to the exterior of the article.

Statement 2. A zip fastener as in Statement 1, in which the gutter comprises a gutter component secured to material of the article on each side of the zip tracks.

Statement 3. A zip fastener as in Statement 2, in which the gutter component is secured to the material at a position beyond the closed position of the slider in direction away from the open position.

Statement 4. A zip fastener as in Statement 2 or 3, in which the gutter component is secured to the material in watertight manner.

Statement 5. A zip fastener as in Statement 4, in which the gutter is secured to the material of the article by welding.

Statement 6. A zip fastener as in any one of the preceding Statements, in which the gutter extends at least beneath a region between the slider in its closed position and the end of zip tracks.

Statement 7. A zip fastener as in Statement 6, in which the gutter extends to a position beyond the closed position of the slider in the direction towards the open position.

Statement 8. A zip fastener as in Statement 6 or 7, in which the gutter extends towards the open position of the slider for a distance less than 10% of the length of the zip tracks.

Statement 9. A zip fastener as in any one of the preceding Statements, in which the gutter is open to the interior of the article at the end of the gutter directed towards the open position of the slider.

Statement 10. A zip fastener as in any one of the preceding Statements, in which a hood is provided on the exterior of the article at the closed position of the slider for accommodating the slider when in the closed position.

Statement 11. A zip fastener as in any one of the preceding Statements, which extends downwardly from the open position to the closed position of the slider in the intended use position of the article.

Statement 12. An article in the form of a cargo pack provided with a zip fastener in accordance with any one of the preceding Statements.

Statement 13. A cargo pack as in Statement 12, provided with attachments for securing the cargo pack to a frame member of a bicycle.

Statement 14. An article provided with a zip fastener in accordance with any one of the preceding Statements, the article being made from a flexible material to which the zip tracks are secured.

The invention claimed is:

1. An article having an opening and a zip fastener for closing the opening, the zip fastener comprising:
   a pair of zip tracks;
   a slider which is displaceable along the zip tracks between an open position of the zip fastener at which the zip tracks are released from each other and a closed position of the zip fastener in which the zip tracks are engaged with each other to close the opening;
   a gutter provided on an inside surface of the article near an end of a first wall of the article, the gutter comprising a gutter component which is formed from a water-impermeable material and which extends across the zip tracks, the gutter component having side edges which are secured in a watertight manner to a material of the article on each side of the zip tracks and an end edge which is secured in a watertight manner to the material of the article near the end of the first wall; and
   a drain hole in the material of the article providing a flow path from the gutter to an exterior of the article.

2. The article as claimed in claim 1, wherein the gutter component is secured to the material of the article by welding.

3. The article as claimed in claim 1, wherein the gutter extends at least beneath a region between the slider in the closed position of the zip fastener and an end of the pair of zip tracks.

4. The article as claimed in claim 3, wherein the gutter extends in a direction that the pair of zip tracks extends in for a certain distance less than a length of the pair of zip tracks.

5. The article as claimed in claim 3, wherein the gutter extends in the direction towards for a distance less than 10% of the length of the zip tracks.

6. The article as claimed in claim 1, wherein the gutter comprises an open end facing towards the direction that the pair of zip tracks extend in.

7. The article as claimed in claim 1, further comprising a hood which is provided on the exterior of the article for accommodating the slider in the closed position of the zip fastener.

8. The article as claimed in claim 1, wherein the zip fastener extends downwardly from near a second wall toward the end of the first wall, the second wall being opposite the first wall.

9. The article as claimed in claim 1, wherein the article is a cargo pack provided with attachments for securing the cargo pack to a frame member of a bicycle.

10. The article as claimed in claim 1, wherein the article is made from a flexible material to which the zip tracks are secured.

* * * * *